United States Patent [19]

Hartman, Jr.

[11] Patent Number: 5,444,780
[45] Date of Patent: Aug. 22, 1995

[54] CLIENT/SERVER BASED SECURE TIMEKEEPING SYSTEM

[75] Inventor: Robert C. Hartman, Jr., Woodside, Calif.

[73] Assignee: International Business Machines Corporation, Armonk, N.Y.

[21] Appl. No.: 96,132

[22] Filed: Jul. 22, 1993

[51] Int. Cl.$^6$ .............................................. H04L 9/30
[52] U.S. Cl. ........................................ 380/30; 380/25
[58] Field of Search .................. 375/1; 380/25, 30, 23

[56] References Cited

U.S. PATENT DOCUMENTS

| | | | |
|---|---|---|---|
| 4,310,720 | 1/1982 | Check, Jr. | 380/25 |
| 4,423,287 | 12/1983 | Zeidler | 380/25 |
| 4,575,621 | 3/1986 | Preifus | 380/25 |
| 4,736,419 | 4/1988 | Roe | 380/23 |
| 4,825,050 | 4/1989 | Griffith et al. | |
| 4,933,898 | 6/1990 | Gilberg et al. | |
| 5,001,752 | 3/1991 | Fischer | 380/30 |
| 5,022,080 | 6/1991 | Durst et al. | 380/23 |
| 5,136,643 | 8/1992 | Fischer | 380/30 |
| 5,136,646 | 8/1992 | Haber et al. | 380/25 |
| 5,136,647 | 8/1992 | Haber et al. | 380/25 |
| 5,166,953 | 11/1992 | Hershey et al. | 375/1 |
| 5,189,700 | 2/1993 | Blandford | 380/23 |

*Primary Examiner*—Salvatore Cangialosi
*Attorney, Agent, or Firm*—David J. Kappos; Hunn: Melvin A.; Andrew J. Dillon

[57] ABSTRACT

A client/server-based secure timekeeping computer system is provided. A secure-time server which is located in a physically trusted environment, includes a highly accurate time-of-day (TOD) clock, along with a key storage area containing a table of public/private key pairs corresponding to clients in the client/server network. The server encrypts a current time value from its TOD clock using a private key corresponding to a selected client. The encrypted time value is then sent to the client over an open communications channel. Each client in the network is equipped with its own secure timekeeping facility housed within the secure boundaries of a single, tamper-proof VLSI chip. Upon receipt of a secure-time transmission, a client uses its own copy of its private key to decrypt the time value, then loads the decrypted time value into its TOD clock. The tamper-proof VLSI chip in each client also includes an authenticated-time indicator, which is set to TRUE to indicate that the TOD clock contains a trusted time. Programs that require secure time may clock the authenticated time indicator before executing and may cancel execution if a secure time is not available. Programs that do not require secure time are able to execute regardless. To maintain the ongoing accuracy of the client TOD clock once it is set with a trusted time value, the secure timekeeping facility in a client may further include calibration and clock stability adjustment mechanisms which receive client clock calibration adjustment values and accuracy duration values, and which apply these values at intervals to maintain the accuracy of the client TOD clock within acceptable limits and mark the clock as untrusted when it can no longer be maintained within acceptable limits.

19 Claims, 4 Drawing Sheets

CLIENT SYSTEM WITH SECURE TIMEKEEPING FACILITY

SECURE-TIME CLIENT/SERVER SYSTEM

FIG. 1

CLIENT SYSTEM WITH SECURE TIMEKEEPING FACULITY

FIG. 2

POWER INTEGRITY MONITOR

CLIENT/SERVER BASED SECURE TIMEKEEPING SYSTEM

FIELD OF THE INVENTION

The present invention relates generally to computer data security, and in particular to a secure timekeeping facility for use in a client-server computer network.

BACKGROUND OF THE INVENTION

Media (i.e. data) security in computer systems is traditionally implemented at multiple levels. One level of security involves the complete denial of access to data. Many schemes exist for the implementation of access-level security, including password protection, logical partitioning, and data encryption. Among the encryption schemes, numerous lock-and-key architectures have been developed. One such architecture is described in U.S. patent application Ser. No. 07/928,850 to Robert C. Hartman, Jr., filed Aug. 11, 1992, which is hereby incorporated by reference. Hartman's access-level security architecture is directed to limiting the usage of digital media to client users having proper licensing authority granted by a Media Clearinghouse (server). The original digital media, which can be program object code, program source code, image, audio, video, text, or any other form of information contained in a file or data object, is encrypted with a Media Master Key by a Media Clearinghouse on behalf of the content creator or owner. The Media Master Key is then further encrypted with a unique private key for each authorized client system. The encrypted media and the encrypted Media Master Keys may then be widely distributed over open, non-secure channels.

Another level of media security, applicable once access is granted, involves restricting access based on time. In a client/server network, time based restrictions themselves involve comparing a time interval for which the server has granted access with a current time, typically the time stored in the client computer system's time-of-day (TOD) clock. However, this comparison and the underlying time-based restriction can easily be rendered meaningless by an intruder, unethical administrator, or knowledgeable user who simply sets the system clock backward or forward to mislead the access mechanism into believing the access interval is still active. Moreover, even if the client TOD clock is not subjected to tampering, it will always be subject to inherent inaccuracies such as drift and instability which over time will cause its value to diverge from the actual current time. Clock drift is the predictable, stable inaccuracy of a clock that causes it to lose or gain time at a constant rate. Clock instability is the unpredictable inaccuracy that causes the clock drift component to change. Factors which cause instability may include environmental temperature, humidity supply voltage, etc. Finally, worse still than any of the foregoing problems, catastrophic events such as power loss can cause the client TOD value to diverge rapidly from the actual current time.

In the prior art, the problem of providing a trusted, or secure, time source has traditionally been solved by periodically generating encrypted time stamps at the server computer system. In one approach, the time stamps are then sent to the client, where they are decrypted and used as a basis for restricting access. This approach suffers from the drawback of being limited to providing discrete time values that can be trusted; it does not address the problems of setting and maintaining a client TOD clock such that the clock itself can be trusted. In a second approach, an encrypted time stamp is applied to an electronic document by the server prior to distributing the document to the client. At the client, the time stamp is used as the basis for access to the document. However, like the previous approach, this system is limited to supplying a fixed number of trusted time stamps, rather than to providing a secure TOD clock outside a secure environment.

A third prior art approach to providing secure time focuses on the client rather than the server. The client TOD clock is initially set using an untrusted time. Then a trusted witness verifies the set time, rendering it a trusted time. To maintain accuracy between settings, multiple clocks are used, and their values are averaged to generate the trusted time. While this approach addresses the problems of discrete time stamps and drift/instability, it incurs its own set of serious disadvantages. First, since a witness is required to establish the trusted time, the system is impractical in any but the smallest and most local of networks. Second, since the verification process required human intervention, it is subject to all the usual human-based failure modes: error, neglect, subterfuge, etc. Third, the use of multiple clocks to maintain accuracy is expensive and inconsistent-in a large percentage of cases, even the average value would diverge quickly from the actual time.

A final prior art scheme has been developed which provides both client and server components to address some of the drawbacks of the above-described systems. In this scheme, the server produces an encrypted authentication code using a secret key, a time value, and an authentication device ID. The server then sends the time, along with the authentication device ID, the encrypted authentication code, and a client-supplied random number, to the requesting client computer. Upon receiving the transmission, the client checks the encrypted authentication code and the random number to verify the security of the time value. To protect against failure caused by power loss, the client includes a mechanism which prevents boot-up until a valid encrypted authentication code and random number are received from the server.

While this scheme represents an improvement over its predecessors, it too incurs certain penalties and leaves remaining impediments. First, it renders the client system inoperative unless a trusted time is available, in which case the client system cannot be used even for tasks which do not require access to trusted time. Second, it does not address the issues of clock drift and instability in the client clock, and thus quickly becomes unreliable due to client TOD clock inaccuracy.

Thus, there has existed an unmet need for a secure timekeeping facility for use in a client/server computer network, which facility provides a server-generated trusted time value for use in setting a client TOD clock, in which a client system may function in the absence of a trusted time value, and which includes facilities to maintain the accuracy of a client clock once it is provided with a trusted time value.

SUMMARY OF THE INVENTION

In accordance with the invention, a client/server-based secure timekeeping computer system is provided. A secure-time server computer system, which is located in a physically trusted environment, includes a highly accurate time-of-day (TOD) clock, along with a key storage area containing a table of public/private key pairs corresponding to clients in the client/server network. In response to a client-based request, or as part of an interval-broadcasting scheme, the server encrypts a current time value From its TOD clock using a private key corresponding to the requesting or selected client. The encrypted time value is then sent to the client over an open communications channel.

Each client in the network is equipped with its own secure timekeeping facility including public/private key pair, central process unit (CPU), and decryption mechanism, all housed within the secure boundaries of a single, tamper-proof VLSI chip. Upon receipt of a secure-time transmission, a client uses its own copy of its private key to decrypt the time value, then loads the decrypted time value into its TOD clock.

In addition to the key pair, CPU, and decryption mechanism, the tamper-proof VLSI chip (secure timekeeping facility) in each client includes an authenticated-time indicator, which is set to TRUE to indicate that the TOD clock contains a trusted time and to FALSE to indicate that the current time in the TOD clock is not trusted. The authenticated time indicator is initialized to FALSE when the client system is powered-on or when a low voltage condition is detected. The authenticated time indicator is made available to client programs on a read-only basis. Programs that require secure time must check the authenticated time indicator before executing, while programs that do not require secure time are able to execute regardless. Thus, even if a trusted time value is not available, useful processing tasks may still be peril,treed on the client computer system.

To maintain the ongoing accuracy of the client TOD clock once it is set with a trusted time value, the secure timekeeping facility is further provided with calibration and clock stability monitoring mechanisms. A calibration adjustment register, an accuracy duration register, and a clock calibrator is provided within the tamper-proof VLSI chip in the client. Within the server system, the CPU is provided with functions to compute client clock calibration adjustment values and client clock stability values. Additional server storage is provided to maintain client clock calibration and stability histories for the various client clocks.

When a client requests a secure time value, it includes in the request the current values of its authenticated time indicator, its TOD clock, its calibration adjustment register, and its accuracy duration register. Upon receiving a request, the server first determines whether the value of the authenticated time indicator is TRUE. If so, the server uses the differences between the received TOD clock value and the current value of the server TOD clock (the client clock drift) to compute a new client clock calibration adjustment value. Then the server compares the client clock drift to the stored stability data for the client and the received client accuracy duration value, and computes a new accuracy duration value. Finally, the server encrypts the new client clock calibration and accuracy duration values, as well as the current server TOD clock value, and sends a response transmission to the client.

Upon receiving a response transmission from the server, the client uses its private key to decrypt the calibration adjustment, accuracy duration, and TOD clock values. The calibration adjustment and accuracy duration values are placed in their respective registers. The TOD clock is set with the TOD clock value, and the authenticated time indicator is set to TRUE. As the client TOD clock runs, the calibration mechanism periodically adjusts the time in accordance with the value in the calibration adjustment register. Meanwhile, the client CPU tracks the progression of the TOD clock versus the accuracy duration register. When the TOD clock reaches the time indicated by the accuracy duration register, the authenticated time indicator is set to FALSE to enable the prevention of further processing requiring a trusted time.

DETAILED DESCRIPTION OF THE INVENTION

Figure 1:
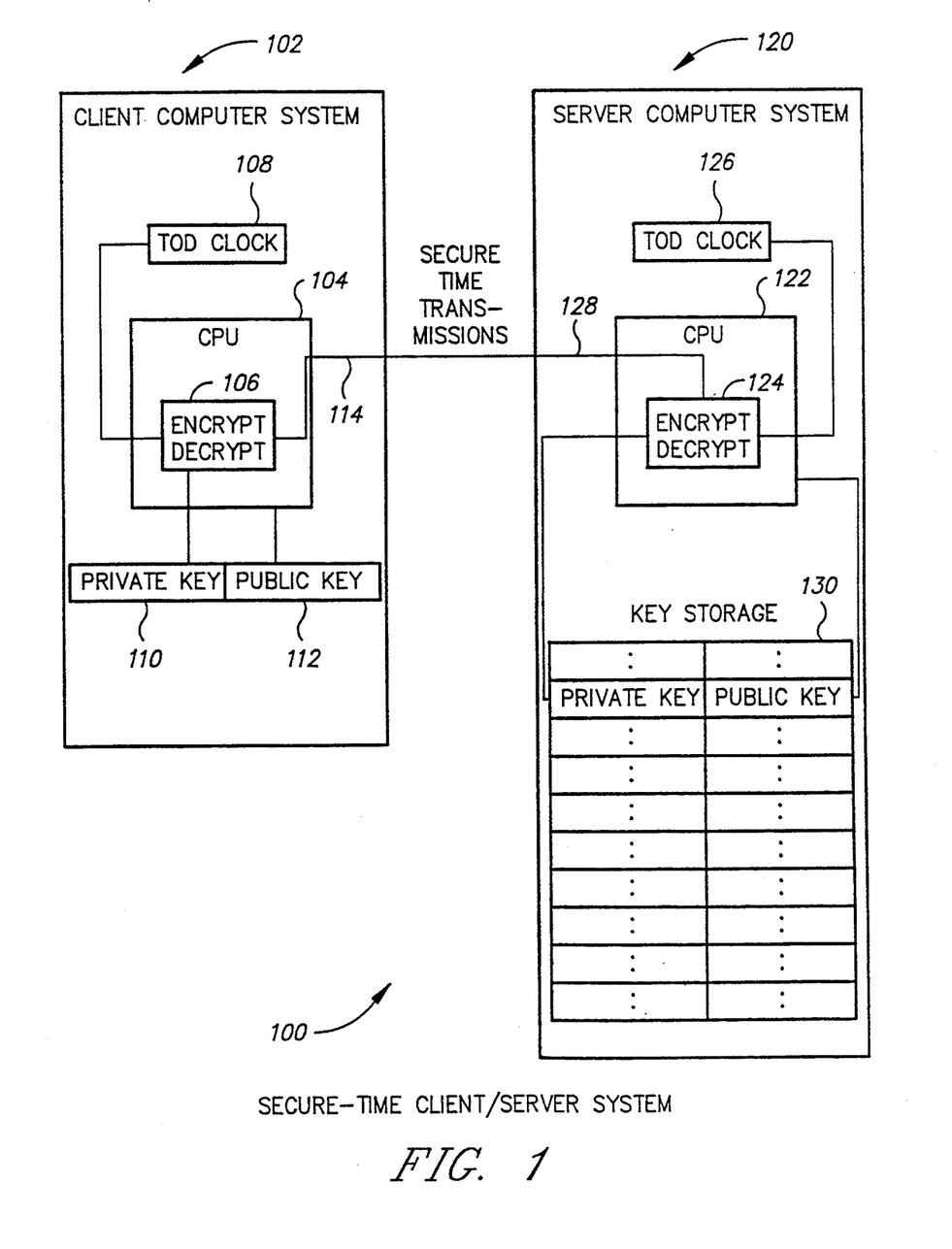
FIG. 1 is a functional diagram illustrating a secure-time client/server system in accordance with the present invention.

Shown in FIG. 1 is a functional diagram illustrating the basic functions of a client/server based secure timekeeping system in accordance with the present invention. Computer network 100 includes client computer system 102 and server computer system 120. Client computer system 102 further includes client central processing unit (CPU) 104 having built-in data encryption/decryption processor 106, time-of-day (TOD) clock 108, private key register 110, public key register 112, and input/output (I/O) port 114 for requesting and receiving secure time data transmissions. Server computer system 120 further includes server CPU 122 having built-in data encryption/decryption processor 124, TOD clock 126, 1/O port 128, and electronic storage 130. Both client and server TOD clocks 108 and 126 include a time clock and a date calendar. The client TOD clock preferably includes enough bit positions to ensure that its value will not wrap to zero within the product life of the client computer system. Server TOD clock 126 is preferably a high accuracy timekeeper which is periodically synchronized to Greenwich Mean Time (GMT) and reports its time values either in GMT or Coordinated Universal time or some local offset from GMT. The client public key value stored in public key register 112 may be any value which uniquely identifies client system 102; preferably it is the system serial number of the client system. The client private key stored in private key register 110 corresponds to a like private key contained in server electronic storage 130. Neither private key value is ever made available to a user. Details of the public/private key system, its architecture and use are not a part of the present invention, but may be found in the aforementioned U.S. patent application Ser. No. 07/928,850. Other key-based security architectures described in the open literature may readily be substituted for use with the present invention.

In operation, server computer system 120 provides secure time information for use by one or more client computer systems such at that shown at 102. In one embodiment of the invention a secure time transmission begins with a request initiated by client system 102. The request includes the value in public key register 112, and is sent through I/O port 114 over an open, non-secure communication channel to server 120. The public key value may be the manufacturer's serial number for the client computer system or any other unique identifier available to the client computer system. To prevent a user from intercepting the subsequent server transmission, recording it, and playing it back to the client at a later time (thereby subverting the ability of the system to provide a trusted time), a message authentication code (MAC) may also be included in the client's request transmission. The MAC is a unique string produced by the client to identify each individual secure time request. It is encrypted by the client prior to transmission. When the server subsequently transmits a secure time value, the MAC is sent back to the client, which matches it with the MAC generated for the request to ensure that the server transmission is indeed a response to the pending client request, rather than a response to some previous request. The use of MACs is discussed in detail in the open cryptographic literature, and thus will not be repeated here. Any available MAC scheme meeting the identification criteria described above may be implemented in conjunction with the present function using one or more additional non-volathe registers in association with supporting function in CPU 104.

Upon receipt of the secure time request at server I/O port 128, electronic storage 130 is accessed to cross-reference, based on the public key, a secret private key. A value is read from server TOD clock 126, and encryption/decryption processor 124 encrypts the value using the cross-referenced private key. Server system 120 then generates a response transmission which includes the encrypted time and date information, and sends the transmission through I/O port 128 back to client system 102.

Upon receipt of the secure time response at client system 102, the client's copy of the private key is extracted from private key register 110 and used by encryption/decryption processor 106 to generate unencrypted time and date information, which is written into client TOD clock 108. The trusted time value in client TOD clock 108 may subsequently be used to validate the time limitation placed on a media license. Thus, if the electronic license received with a digital video transmission or with a trial copy of a software package, for instance, indicates that the license is to expire at time X, a TOD clock check may be performed by client system licensing software prior to performing the video or initiating the software. If the TOD clock value is chronologically less than time X, the licensing software may allow the performance/execution to commence; if the TOD clock value is chronologically greater than time X, the licensing software will prevent performance/execution based on the expired license. From the client's point of view additional benefits are apparent, as the client system (consumer) is provided with a highly accurate TOD clock setting without the need for human intervention. Moreover, the client TOD clock may be displayed in any form desired. And as a further service to the user, the server may optionally provide updates regarding statutory time changes such as daylight savings lime, thereby relieving the consumer of the need to remember these infrequent events.

Figure 2:
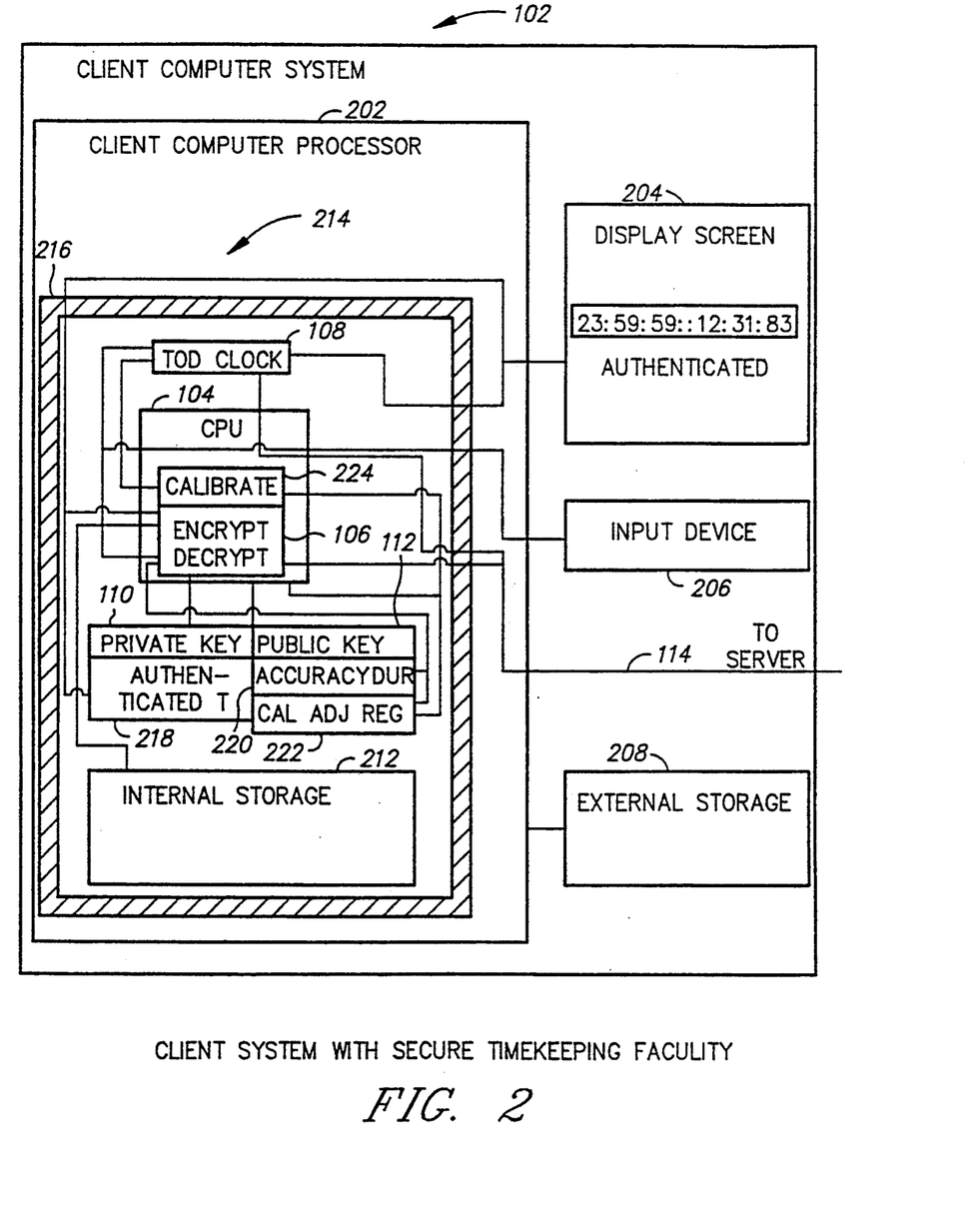
FIG. 2 is a functional diagram illustrating a client computer system which includes a secure timekeeping facility in accordance with the present invention.

Shown in FIG. 2 is a functional diagram illustrating in detail the structure and interaction of a client computer system having a secure timekeeping facility in accordance with the present invention. The client computer system is designated generally as 102. The system includes client computer processor 202, display screen 104 input device 206, external storage 208, and I/O port 114. Input device 206 may be a keyboard, mouse, joystick, or any other operator-to-machine communication device. External storage 108 may be random access memory, disk storage, tape storage, etc.. Client computer processor 202 includes a secure timekeeping facility, designated generally as 214. The secure timekeeping facility is entirely encapsulated in a physically secure electronic package, designated as 216. Inside secure package 216 is client CPU 104 (which performs many functions in addition to timekeeping), client TOD clock 108, private key register 110 and public key register 112, internal electronic storage (cache) 212, authenticated time indicator 218 accuracy duration register 220, and calibration adjustment register 222. Client CPU 104 further includes in addition to control, logic, and computational circuitry (not shown), encryption/decryption processor 106 and clock calibrator 224, and electronics which enable the CPU to set and read the various other components of secure timekeeping facility 214. Client TOD clock 108 is provided with inputs for receiving time and date values from CPU 104 and calibration adjustments from clock calibrator 224, as well as an output for providing time and {late values upon CPU or program request. The client TOD clock may be implemented in accordance with any of a variety of schemes described in the open literature, provided all the constituent components are located in physically secure electronic package 216. The preferred embodiment includes a clock register incremented by a clock pulse generator.

In operation, client computer system 102 may function and perform useful tasks with or without an authenticated time, receiving commands via input device 206, reading and writing data to and from internal storage 212 and external storage 208, outputting status, results, and other feedback to display screen 204. At system power-on and at all other times when the system is operating without an authenticated time value in TOD clock 108, authenticated time indicator 218 is set to FALSE by CPU 104. Tasks that are independent of secure time are performed as usual. TOD clock 108 may be set to any desired value by a user, by software, by another system, etc. Authenticated time indicator 218, however, may not be set except by CPU 104 within physically secure electronic package 216. On the other hand, authenticated time indicator 218 is made available on a read-only basis to any program executing in computer system 102. Thus, if a program is initiated which has a time-constrained license, or if, a user attempts to play media (an audio recording, a movie, etc.) which has a time-constrained license, the initiating software may determine immediately, by reading the value of, the authenticated time indicator, whether the TOD clock value can be trusted as a basis for allowing execution to begin. If the value is FALSE, execution is refused. Further, in the preferred embodiment the initiating software itself, executes in an encrypted code segment to protect against subversion of the validation process, as is more fully described in aforementioned patent application Ser. No. 07/928,850.

When the computer system is operating with an authenticated time in TOD clock 108, authenticated time indicator 218 is set to TRUE by CPU 104. Tasks that are independent of secure time are still performed as usual. If a program is initiated which has a time-constrained license, or if, a user attempts to play media which has a time-constrained license, the initiating software reads the value of the authenticated time indicator, detects from the TRUE response that TOD clock 108 contains a trusted time, then reads the current time and date contained in TOD clock 108 and compares with the licensing criteria to determine whether execution may be permitted. As shown in display screen 204, a system user may also readily access the current time and date values in unencrypted form, as well as the value of the authenticated time indicator.

Subsequent to the setting of TOD clock 108 with a trusted and secure time value, accuracy duration register 220, calibration adjustment register 222, and clock calibrator 224 cooperate under control of CPU 104 to maintain the ongoing accuracy of TOD clock 108 and to establish a time at which the accuracy of TOD clock 108 can no longer be trusted. The basic purpose of calibration adjustment is to compensate for fast and slow running clocks. Calibration adjustment register 222 contains a value, provided by the server, which is used by clock calibrator 224 to adjust the value of TOD clock 108 as required to maintain its accuracy over extended periods of time. In the preferred embodiment, calibration adjustment register 222 contains a signed value which specifies an adjustment interval and an adjustment polarity. This value is provided to clock calibrator 224, which continuously monitors the incrementing of TOD clock 108 until the number of increments since the last calibration adjustment equals the adjustment interval, that is the absolute value of calibration adjustment register 222. When this occurs, clock calibrator 224 adjusts TOD clock 108 by one increment. The polarity of the adjustment is determined by the polarity of calibration adjustment register 222. Thus, if the sign value in the register is positive, a positive adjustment of one extra increment is applied to TOD clock 108; if the sign value in the register is negative, one increment is skipped; if the value in the register is zero, no adjustment is applied (zero increments). Once the calibration adjustment is made, the clock calibrator is reset and the process repeats.

Accuracy duration register 220 contains a value, provided by the server, which indicates a time at which TOD clock 108 may no longer be trusted. This value is provided in recognition and as a function of the historical instability of TOD clock 108, that is, in recognition that the clock drift associated with TOD clock 108 (which is corrected by calibrator 224) may vary, and thus may not be fully correctable by periodic calibration adjustments. In/he preferred embodiment accuracy duration register 220 contains a date and time value. Under control of CPU 104, this value is compared periodically with the current value of TOD clock 108. Comparisons may be triggered by hour increments, date increments calibration adjustments, reading of TOD clock 108, or on any other basis sufficient to ensure that the accuracy duration value is not exceeded. When the accuracy duration value is reached, CPU 104 sets authenticated time indicator 218 to FALSE to indicate that the time and date values in TOD clock 108 are no longer trusted.

In accordance with the preferred embodiment, architected instructions are provided for use by client clock maintenance software, licensing software, and client system users desiring access to the various components of secure timekeeping facility 214. A SET CURRENT TIME instruction is provided which can receive encrypted or unencrypted values for client TOD clock 108, accuracy duration register 220, and calibration adjustment register 222, and place these values in the corresponding locations. As part of the SET CURRENT TIME instruction the authenticated time indicator is set TRUE if the operands are encrypted, and is set FALSE if they are unencrypted. Since only the server has the ability to provide time information encrypted with the private key, a user may set a current time but is unable to invoke the SET CURRENT TIME instruction so as to set a TRUE value in the authenticated time indicator.

To retrieve values from secure timekeeping facility 214, a GET CURRENT TIME instruction is provided. This instruction may be used by any client software—encrypted (trusted) or unencrypted (untrusted)—to read the values of TOD clock 108, authenticated lime indicator 218, accuracy duration register 220, and calibration adjustment register 222.

It is to be noted that both the SET CURRENT TIME and GET CURRENT TIME instructions may be implemented as multiple atomic instructions, each of which sets/retrieves a single component of secure timekeeping facility 214. Moreover, the function performed by SET CURRENT TIME when handling encrypted data may be implemented within secure timekeeping facility 214 without the use of an externally architected instruction. That is, upon receipt of encrypted time information at I/O port 114, CPU 104 may, without client software instigation, decrypt the time information and place it in TOD clock 108, accuracy duration register 220, and calibration adjustment register 222.

Client computer system 102 may operate in a secure-time request-receive network, where it must periodically initiate secure time transmissions, or it may operate in a secure-time broadcast network, where a server periodically initiates transmissions without the need for a client request. In a request-receive network, client computer processor 202 initiates a secure time transmission by sending a secure time request to server 120. The request is composed by CPU 104, and includes the present values of the various components of secure timekeeping facility 214, including the values of client TOD clock 108, authenticated time indicator 218, accuracy duration register 220, calibration adjustment register 222, and public key 112. In the preferred embodiment, the information is conveniently accumulated using the GET CURRENT TIME instruction and further includes a MAC to prevent the record-playback problem. In any event, the information is encrypted by encrypt/decrypt processor 106 using the client's private key, packaged for transmission along with the client's public key, and transmitted over I/O port 114 to the server system. As will be described subsequently with reference to FIG. 4, the server system computes a new accuracy duration value and a new calibration adjustment value, generates a new client TOD clock value, encrypts this information (along with the MAC, in the preferred embodiment) using the private key corresponding to the client's public key, and returns the encrypted information to client completer system 102. Upon receipt, encryption/decryption processor 106 used private key 110 to decrypt the new TOD clock, accuracy duration, and calibration adjustment values. In the preferred embodiment the MAC is also decryprod and used to match the server response with the client request. CPU 04 then sets the various other components of secure timekeeping facility 214 by placing the new TOD clock value in TOD clock 108, the new accuracy duration value in accuracy duration register 220, and the new calibration adjustment value in calibration adjustment register 222. Finally, authenticated time indicator 218 is set to TRUE to indicate that the encrypted time and date values were successfully processed and an authenticated and trusted TOD clock value is now being used.

In a secure-time broadcast network, client operation is similar to that described above, except that no client request is generated. Instead, the server periodically generates secure-time broadcasts, encrypted with client private keys and identified by corresponding client public keys, or sends encrypted time master keys to all clients, followed by one secure time broadcast to all clients simultaneously, which broadcast is then decrypted at the clients using the time master key previously sent. Since the broadcasts are unsolicited, the server does not have sufficient data to generate new accuracy duration and calibration adjustment values; thus, this mode of operation omits the inclusion of that information. Upon receipt of a broadcast secure-time transmission, the new TOD clock value is decrypted and inserted into TOD clock 108 as described above, and authenticated time indicator 218 is set to TRUE.

In the preferred embodiment, where message authentication is necessary, the broadest mode is preceded by the client sending an introductory transmission which includes a first MAC. Subsequently, when the server broadcasts a secure time transmission to the client the first MAC is included. The client acknowledges receipt by sending a new MAC for use by the server when the server broadcasts the next secure time transmission. This process is then repeated at each broadcast. Further, this broadcast-with-MAC made of operation may include, in the client acknowledgement, values of the client TOD clock. The authenticated time indicator, the accuracy duration requester, and the calibration adjustment register to partially ameliorate the above-mentioned disadvantage of broadcast mode and enable the server to provide updated values for accuracy duration and calibration adjustment in its next broadcast. These values may not be as accurate as in request/respond mode, since the next broadcast may occur significantly later in time than the acknowledgement on which the values are based; however, this latter problem may itself be addressed by increasing the broadcast frequency within the bandwidth limitations of the client.

Figure 3:
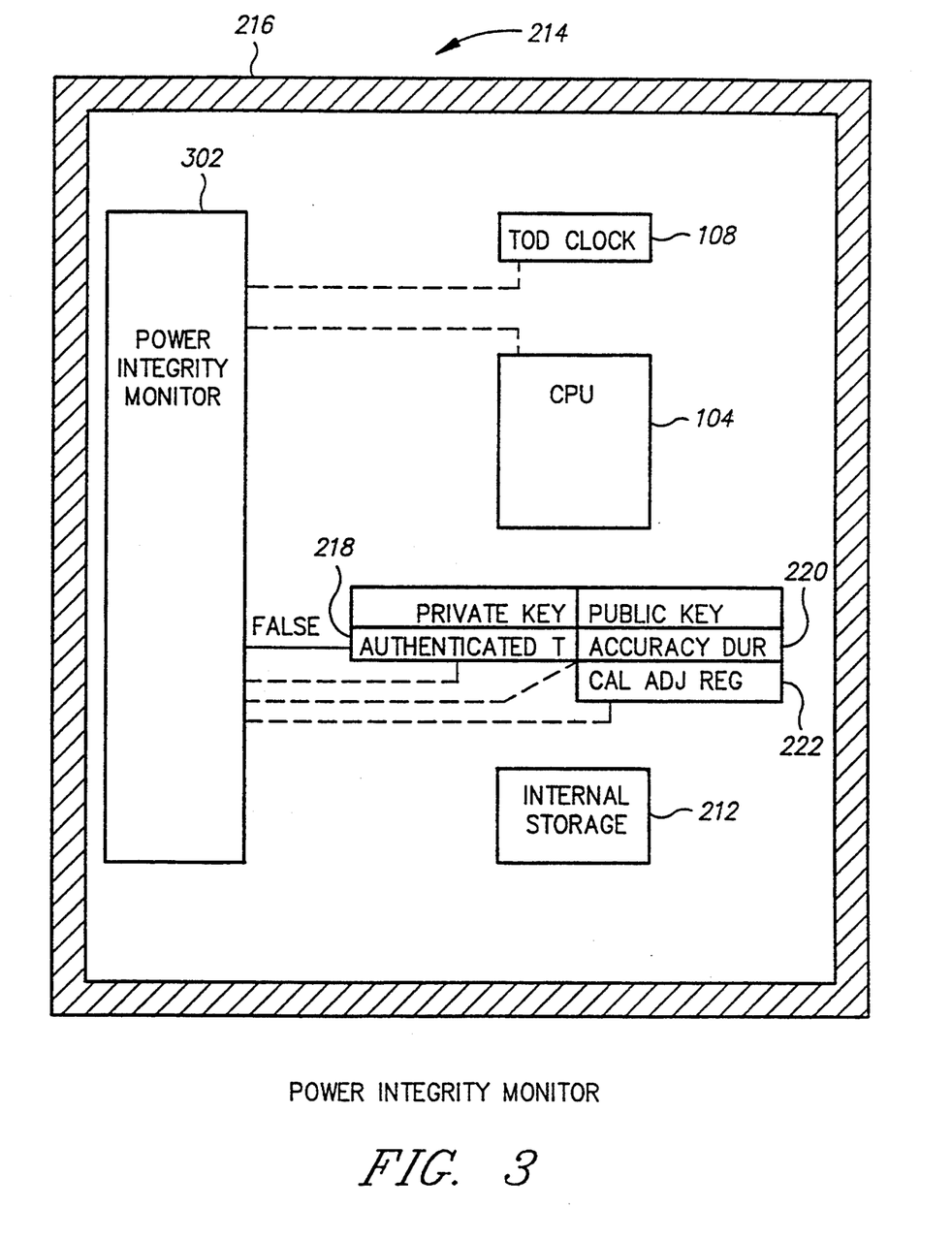
FIG. 3 is a functional diagram illustrating a power integrity monitor for use in a client computer system in accordance with the present invention.

Shown in FIG. 3 is an additional feature provided for use in monitoring the power supply integrity in client computer system 102. Power integrity monitor 302 is added to secure timekeeping facility 214 within physically secure package 216. Power integrity monitor 302 is connected via monitoring electronics (denoted by dotted lines) to other components of the secure timekeeping facility, including CPU 104, TOD clock 108, authenticated time indicator 218, accuracy duration register 220 and calibration adjustment register 222. In operation, power integrity monitor 302 continuously monitors the voltage levels of the indicated components versus a pro-selected normal range which corresponds to the technology limits of the electronic devices used in the client computer system. If the supplied normal or back-up voltage falls outside the range that will maintain constant and accurate operation of the secure timekeeping facility components, power integrity monitor 302 sets the value of authenticated time indicator 218 to FALSE to indicate that TOD clock 108 can no longer be trusted.

It is to be noted that many variations on power integrity monitor 302 are possible. For instance, rather than monitoring all components of the secure timekeeping facility, power integrity monitor 302 may be configured to monitor only the voltage at TOD clock 108, or at some other subset of components. Alternatively, the power routing into secure timekeeping facility 214 may be designed such that a single incoming power path is provided. In this case, power integrity monitor 302 may monitor the incoming power path directly, rather than each component in the secure timekeeping facility individually. Finally, the particular electrical device selected and the low-level implementation chosen to provide the power integrity monitoring function within 302 are a matter of design choice; numerous alternatives are presented in the open literature and accordingly will not be repeated here.

Figure 4:
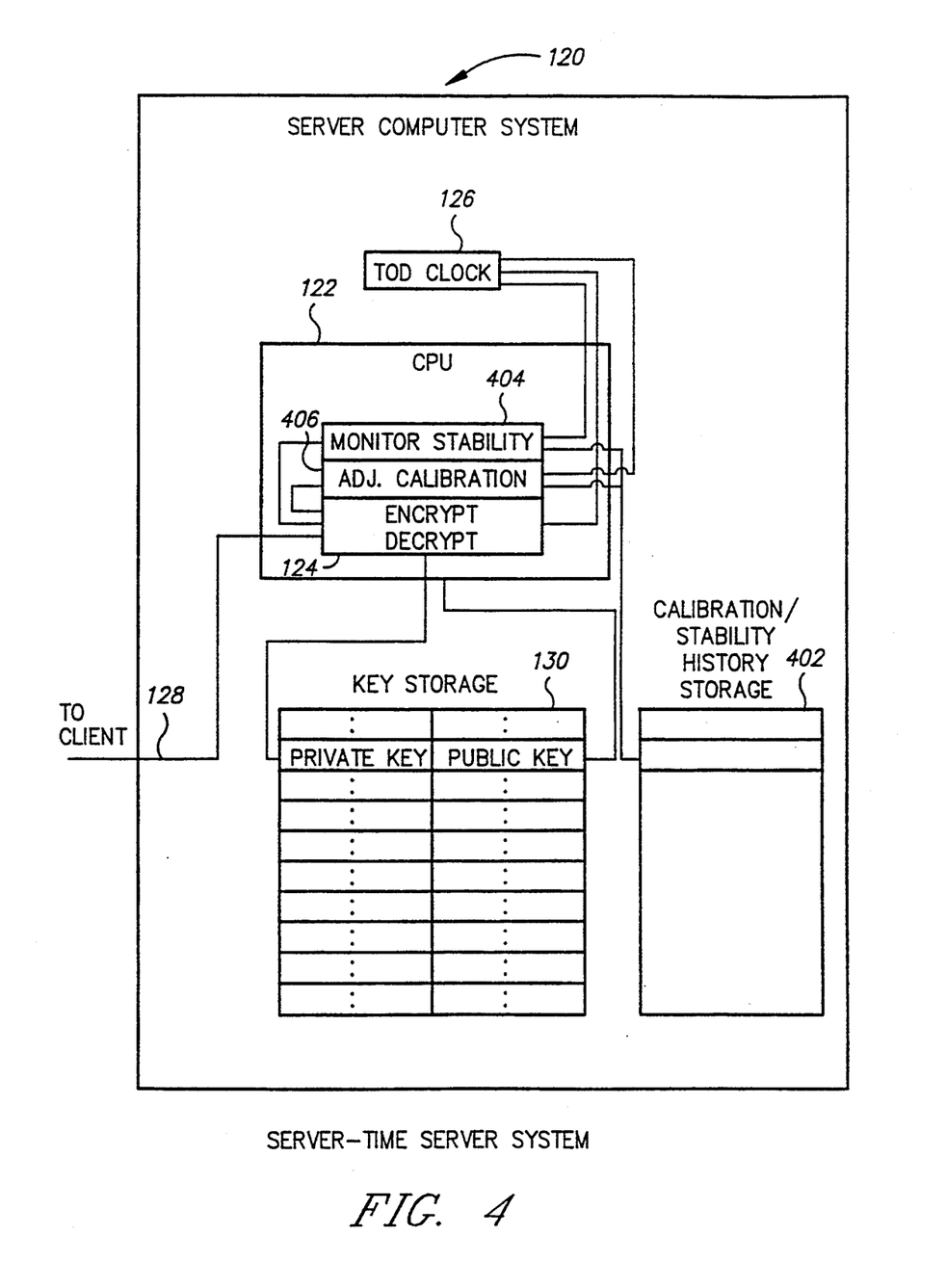
FIG. 4 is a functional diagram illustrating a secure time server system in accordance with the present invention.

Shown in FIG. 4 is a functional diagram illustrating in detail the structure and interaction of a server computer system for providing secure time transmissions to a client computer system in accordance with the present invention. The server computer system (secure time server) is designated generally as 120 and is located in a physically secure data center. The system includes server CPU 112, server TOD clock 126, I/O port 128, public key and private key storage area 130, and calibration stability history storage area 402. Server CPU 122 itself includes encryption/decryption processor 124, stability monitoring processor 404, and calibration processor 406 (and may of course include many additional functional components typically found in CPUs described in the open literature). TOD clock 126 includes a time clock and a date calendar, preferably based on a highly accurate time source, which may be set to Coordinated Universal Time, Greenwich Mean Time, or some local time. I/O port 128 is connected via electronic communication network to one or more client computer systems (secure time requestors) and provides the I/O mechanism for receiving client TOD clock values as well as client calibration and stability data and for sending new client TOD clock values as well as new calibration and stability data to secure-time requestors. Key storage area 130 and calibration/stability history storage area 402 may be maintained in any digital storage medium, such as RAM, disk, tape, etc.

In the request-receive mode of operation, server operations begin when a secure time request is received via I/O port 128. The request is first decrypted by server encrypt/decrypt processor 124. Following decryption, the received authenticated time indicator value is checked. If it is FALSE, the other information in the client request is ignored. The current time and date are obtained from TOD clock 126, the client's historical calibration adjustment and accuracy duration values are obtained from stability history storage area 402 (or alternatively, default values are selected for calibration adjustment and accuracy duration), all the information is encrypted by encrypt/decrypt processor 124, and the encrypted data is transmitted to the requesting client via I/O port 128.

If the received authenticated time indicator value is TRUE, this indicates that the value of the client's TOD clock was set using a secure time and may still be trusted. Accordingly, server system 120 proceeds to generate new accuracy duration and calibration adjustment values using the received client TOD clock, accuracy duration, and calibration adjustment values. In particular, to generate a new calibration adjustment value, calibration adjustment processor 406 compares the present value of TOD clock 126 with the received client TOD clock value and modifies the client's calibration adjustment value accordingly. In the preferred embodiment, an heuristic approach is used to determine a new calibration adjustment value by evaluating the effect of the previous value and feeding this information back to achieve damped closure on an optimum value. In a particular implementation of this approach, the difference between the present value of TOD clock 126 and the received client TOD clock value is combined with the total number of calibration adjustments made to the client clock since it was set, and the result is divided into the total number of increments over the period since the client TOD clock was set to determine a new calibration adjustment value for the client. This value is stored in stability history storage area 402 for possible use when the next secure-time request is received from this client.

To generate a new accuracy duration value, the accumulated error in the client TOD clock value (as determined previously with reference to the calibration adjustment value), along with the time period since the client TOD clock was set, is compared by stability monitoring processor 404 with predefined criteria which establish the acceptable instability of the client TOD clock as a function of time. A new accuracy duration value is chosen such that the previous instability level will cause an accumulation of no more than the acceptable amount of clock error over the entire accuracy duration. This value is stored in stability history storage area 402 for possible use when the next secure time request is received from this client. As with the calibration adjustment value, in the preferred embodiment an heuristic approach is used to determine a new accuracy duration value by evaluating the effect, of the previous value and feeding this information back to achieve damped closure on an optimum value.

It is to be noted that numerous variation are possible with respect to the maintenance of historical accuracy duration and calibration adjustment information. For instance, sufficient historical values of the accuracy duration and calibration adjustment registers may be maintained in server history storage 402 such that these items can be omitted from client requests. Or, full historical information may be maintained for accuracy duration values, and none kept for calibration adjustment values, or vice versa, requiring the client to send the non-maintained values in its secure time requests.

Following the generation of the new accuracy duration and calibration adjustment values as described above, both values are encrypted, along with the current value of server TOD clock 126, by encrypt/decrypt processor 124 using the private key corresponding to the requesting client. The encrypted data is transmitted to the requesting client via I/O port 128.

In the case where server computer system 120 is operating in a broadcast mode, as explained previously, the information required to generate new accuracy duration and calibration adjustment values may not be available to server computer system 120. In this case, only the secure TOD clock value is broadcast. Alternatively, historical values for accuracy duration and calibration adjustment may be obtained from stability history storage 402, or default values may be generated, encrypted, and broadcast along with the TOD clock value. As a further alternative, broadcast mode may be interspersed with request-receive mode to provide time-only updates at selected intervals and complete secure time facility updates at other intervals, or a broadcast-with-MAC approach may be used in which each client acknowledgement includes at least the client TOD clock value.

While the invention has been particularly described and illustrated with reference to a preferred embodiment, it will be understood by those skilled in the art that changes in the description and illustrations may be made with respect to form and detail without departing from the spirit and scope of the invention. Accordingly, the present invention is to be considered as encompassing all modifications and variations coming within the scope defined by the following claims.

What is claimed is:

1. A secure timekeeping facility for use in a computer system that includes a central processing unit and electronic storage located in a physically secure package, comprising:
   a public key register for holding a public key for use in identifying a private key for encrypting and decrypting at least time and date transmissions;
   a private key register for holding the private key;
   an input for receiving (a) time and date information and (b) clock accuracy-enhancing operation data, encrypted using the private key;
   data decryption means for decrypting (a) the received time and date information and (b) said clock accuracy-enhancing operation data, using the private key;
   a time-of-day (TOD) clock including a time clock and a date calendar, having an input for receiving decrypted time and date information and an output for providing unencrypted time and date information, which is subject to modification by said clock accuracy-enhancing operation data.

2. The secure timekeeping facility as recited in claim 1, wherein the TOD clock is located in the same physically secure package as the central processing unit.

3. The secure timekeeping facility as recited in claim 1, wherein the public key corresponds with a system serial number for the computer system.

4. The secure timekeeping facility as recited in claim 1, wherein the public key is unique to the computer system and is accessible outside the physically secure package.

5. The secure timekeeping facility as recited in claim 1, wherein the private key is unique to the computer system and is inaccessible outside the physically secure package.

6. The secure timekeeping facility as recited in claim 1, further comprising secure-time request means for requesting from a time server any of current time and date information encrypted using the private key.

7. The secure timekeeping facility as recited in claim 6, wherein a request initiated by the secure-time request means includes the present value of the TOD clock.

8. The secure timekeeping facility as recited in claim 1, further comprising client clock calibration means for receiving any of a time and date calibration value and for applying the calibration value to the TOD clock.

9. The secure timekeeping facility as recited in claim 8, wherein the calibration value is encrypted using the private key.

10. A secure time server for use in a computer network, comprising:

a server time-of-day (TOD) clock including a time clock and a date calendar;

an input for receiving a secure time request including a public key;

processor means for identifying a private key corresponding to the public key;

data encryption means for encrypting time and date information from the TOD clock using the private key;

an output for sending the encrypted time and date information to the secure time requestor; and means for passing clock operation data between said secure time server and said secure time requestor.

11. The secure time server as recited in claim 10, wherein said means for passing includes:

calibration adjustment means for computing a client clock calibration value based on any of the value of the server TOD clock, time, date, and calibration history information received from the client, and a calibration history accumulated from prior client clock calibration computations.

12. The secure time server as recited in claim 10, wherein said means for passing includes:

client stability monitoring means for computing a client clock stability value based on any of the value of the server TOD clock, time, date and stability history information received from the client, and a stability history accumulated from prior client clock stability computations.

13. The secure time server as recited in claim 11, wherein the client clock calibration value is further computed from the amount of drift accumulated in the client TOD clock since the last setting of the client TOD clock.

14. The secure time server as recited in claim 11, wherein the calibration value is encrypted using the private key.

15. A secure time server for use in a computer network, comprising:

a server time-of-day (TOD) clock including a time clock and a date calendar;

processor means for identifying a public key and a private key for which to generate a secure time transmission;

date encryption means for encrypting time and date information from the TOD clock using the private key; and an output for broadcasting the public key and the encrypted time, date information and clock operation data.

16. The secure time server as recited in claim 15, further comprising:

calibration adjustment means for computing a client clock calibration value., which is broadcast as clock operation data based on any of the value of the server TOD clock, time, date, and calibration history information received from the client, and a calibration history accumulated from prior client clock calibration computations.

17. The secure time server as recited in claim 15, further comprising:

client stability monitoring means for computing a client clock stability value, which is broadcast as clock operation data based on any of the value of the server TOD clock, time, date, and stability history information received from the client, and a stability history accumulated from prior client clock stability computations.

18. The secure time server as recited in claim 16, wherein the client clock calibration value is further computed from the amount of drift accumulated in the client TOD clock since the last setting of the client TOD clock.

19. The secure lime server as recited in claim 15 wherein the calibration value is encrypted using the private key.

* * * * *

UNITED STATES PATENT AND TRADEMARK OFFICE
CERTIFICATE OF CORRECTION

PATENT NO. : 5,444,780
DATED : August 22, 1995
INVENTOR(S) : Hartman, Jr.

It is certified that error appears in the above-indentified patent and that said Letters Patent is hereby corrected as shown below:

Column 3, line 33: change "peril,treed" to
--performed--

Column 5, lines 25-26: change "nonvolathe" to
--nonvolatile--

Column 5, line 64: change "lime" to
--time--

Column 6, line 61: delete "," after "itself"

Column 8, line 18: change "lime" to
--time--

Column 11, line 41: change "variation" to
--variations--

UNITED STATES PATENT AND TRADEMARK OFFICE
CERTIFICATE OF CORRECTION

PATENT NO. : 5,444,780
DATED : August 22, 1995
INVENTOR(S) : Hartman, Jr.

It is certified that error appears in the above-indentified patent and that said Letters Patent is hereby corrected as shown below:

Column 14, line 37: change "lime" to --time--.

Signed and Sealed this

Second Day of July, 1996

Attest:

BRUCE LEHMAN

Attesting Officer

Commissioner of Patents and Trademarks